(12) United States Patent
Li et al.

(10) Patent No.: US 8,005,131 B2
(45) Date of Patent: Aug. 23, 2011

(54) DELAY COMPENSATION FOR TRANSMIT/RECEIVE CHAIN CALIBRATION AND MULTIUSER MIMO

(75) Inventors: Qinghua Li, Sunnyvale, CA (US); Jun Shi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 999 days.

(21) Appl. No.: 11/903,488

(22) Filed: Sep. 21, 2007

(65) Prior Publication Data

US 2009/0080504 A1    Mar. 26, 2009

(51) Int. Cl.
*H04B 1/38*        (2006.01)
*H04L 5/16*        (2006.01)

(52) U.S. Cl. .................. 375/220; 375/295; 375/349

(58) Field of Classification Search ............. 375/267, 375/220, 295, 349, 260, 259, 219, 346, 316
See application file for complete search history.

(56) References Cited

U.S. PATENT DOCUMENTS

| | | | |
|---|---|---|---|
| 2004/0142698 A1* | 7/2004 | Pietraski | 455/452.2 |
| 2006/0165008 A1* | 7/2006 | Li et al. | 370/252 |
| 2007/0086536 A1* | 4/2007 | Ketchum et al. | 375/260 |
| 2007/0092012 A1* | 4/2007 | Wilhelmsson et al. | 375/260 |
| 2008/0019279 A1* | 1/2008 | Kim et al. | 370/241 |
| 2008/0267056 A1* | 10/2008 | Aryanfar et al. | 370/203 |

* cited by examiner

*Primary Examiner* — Dac V Ha
*Assistant Examiner* — Brian J Stevens
(74) *Attorney, Agent, or Firm* — Thorpe North & Western LLP (57) ABSTRACT

Compensation is provided for errors in channel information that can result when there is a delay between the measurement of the channel information and the subsequent use of the channel information. In one embodiment, downlink channel prediction is performed within a user device, in a system employing closed loop MIMO with implicit feedback, to reduce the occurrence of errors during the calculation of a calibration parameter within an associated base station. In another embodiment, channel prediction is used to predict a downlink channel state for a user device at a future time when a multi-user MIMO data transfer is to occur between a base station and a number of selected user devices.

11 Claims, 5 Drawing Sheets

DELAY COMPENSATION FOR TRANSMIT/RECEIVE CHAIN CALIBRATION AND MULTIUSER MIMO

TECHNICAL FIELD

The invention relates generally to wireless communication and, more particularly, to techniques for compensating for delays between measurement and use of channel information in a time varying wireless channel.

BACKGROUND OF THE INVENTION

In a wireless communication system, it is often necessary to measure the state of the wireless channel between two communication devices to improve some aspect of the communication between the devices. If the wireless channel is time varying, then the measured channel state information (CSI) will only be valid temporarily. Use of the CSI after this temporary period can lead to a significant reduction in communication performance in the wireless channel. However, there are many wireless applications that do not allow measured channel state information to be immediately applied.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
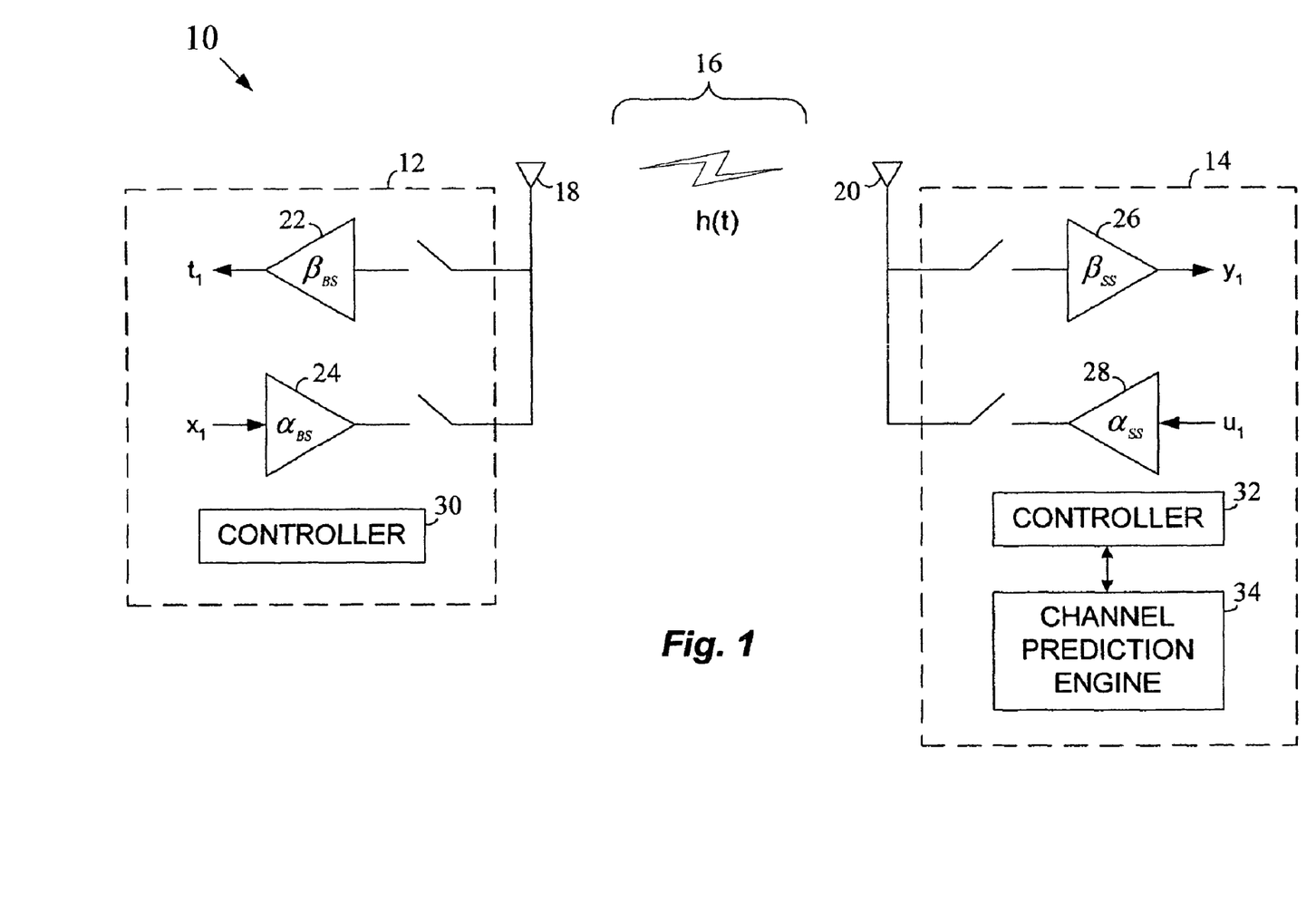
FIG. 1 is a diagram illustrating an example wireless network arrangement in accordance with an embodiment of the present invention.

FIG. 1 is a diagram illustrating an example wireless network arrangement 10 in accordance with an embodiment of the present invention. As shown, the arrangement 10 includes a base station (BS) 12 and a subscriber station (SS) 14 that are communicating with one another through a wireless channel 16. The BS 12 and the SS 14 may each include one or more antennas 18, 20 to transmit signals into, and receive signals from, the wireless channel 16. The antennas 18, 20 may include any type of antenna including, for example, a dipole, a patch, a helical antenna, an antenna array, and/or others. In at least one embodiment of the invention, the BS 12 and the SS 14 may each include multiple antennas to support, for example, multiple input, multiple output (MIMO) communication.

As illustrated in FIG. 1, the BS 12 and the SS 14 may also each include a controller 30, 32 for managing communication related functions of the devices. The controllers 30, 32 may each be implemented using one or more digital processing devices that may include, for example, a general purpose microprocessor, a digital signal processor (DSP), a field programmable gate array (FPGA), a reduced instruction set computer (RISC), a complex instructions set computer (CIS C), a microcontroller, a application specific integrated circuit (ASIC), and/or others, including combinations of the above.

MIMO may be practiced as either an open loop or a closed loop technique. In open loop MIMO, a transmitting device does not have knowledge about the channel it is transmitting into before a signal is transmitted. In closed loop MIMO, on the other hand, a transmitting device uses knowledge of the channel to "pre-code" a signal before it is transmitted. By pre-coding the signal, the signal may be tailored to the present channel in a manner that increases overall communication performance. Closed loop MIMO generally requires the use of some form of feedback from the receiving device to the transmitting device. This feedback may be explicit feedback or implicit feedback. When using explicit feedback, the transmitting device (e.g., BS 12 in FIG. 1) may transmit a channel sounding signal to the receiving device (e.g., SS 14 in FIG. 1) that allows the receiving device to calculate channel state information (CSI) that describes the channel. The receiving device may then transmit the CSI, or a derivative thereof (e.g., a compressed or uncompressed beam forming matrix, etc.), back to the transmitting device for use in pre-coding. In contrast, implicit feedback relies on the reciprocal nature of the wireless medium to allow a transmitting device to gain knowledge of the wireless channel it is transmitting into. When using implicit feedback, an initial calibration needs to be performed to calibrate for differences in the downlink and uplink channel responses that are due to transmitter circuitry and receiver circuitry within the corresponding devices. Once the calibration has been performed, the receiving device may simply sound the channel to the transmitting device and the transmitting device will be able to estimate the channel in the reverse direction for use in pre-coding.

The reciprocal property of the wireless channel typically applies to the wireless portion of the channel and not to the circuitry portions. That is, there is reciprocity between (1) the uplink channel from the antenna(s) 20 of the SS 14 to the antenna(s) 18 of the BS 12 and (2) the downlink channel from the antenna(s) 18 of the BS 12 to the antenna(s) 20 of the SS 14. However, in addition to the wireless medium portion of the channel response, there are also circuitry portions (e.g., transmitter and receiver circuitry) that need to be taken into account. As will be appreciated, these circuitry portions will be different in the uplink and downlink directions. The calibration procedure is meant to deal with these circuitry portions of the channel responses so that implicit feedback may be taken advantage of.

As illustrated in FIG. 1, the BS 12 includes a receiver 22 (having a response $\beta_{BS}$) and a transmitter 24 (having a response $\alpha_{BS}$). Similarly, the SS 14 includes a receiver 26 (having a response $\beta_{SS}$) and a transmitter 28 (having a response $\alpha_{SS}$). Thus, the total channel response in the downlink direction from the BS 12 to the SS 14 may be expressed as:

$$\text{downlink response} = g_D = \alpha_{BS} h_D \beta_{SS}$$

and the total channel response in the uplink direction from the SS 14 to the BS 12 may be expressed as:

$$\text{uplink response} = g_U = \alpha_{SS} h_U \beta_{BS}$$

where $h_D$ and $h_U$ are the wireless medium responses in the downlink and uplink, respectively. The goal of the calibration procedure is to find the ratio:

$$\rho = \frac{\alpha_{BS} \beta_{SS}}{\alpha_{SS} \beta_{BS}}.$$

Once this ratio has been determined, the downlink response can be calculated by simply sounding the uplink channel, using the uplink channel sounding within the BS 12 to determine the uplink channel response, and then multiplying the uplink response by $\rho$ (i.e., implicit feedback). The reciprocity of the channel with the circuitry can also be established in other ways using the ratio. Techniques for determining a channel response using received channel sounding signals are well known in the art.

The value of $\rho$ may be estimated by assuming that the wireless medium responses in the downlink and uplink (i.e., $h_D$ and $h_U$) are equal. This may be expressed as follows:

$$\rho = \frac{\alpha_{BS} \beta_{SS}}{\alpha_{SS} \beta_{BS}} \approx \frac{\alpha_{BS} h_D \beta_{SS}}{\alpha_{SS} h_U \beta_{BS}}.$$

During the calibration procedure, the value of the downlink response ($\alpha_{BS} h_D \beta_{SS}$) is first obtained by sounding the downlink channel (from the BS 12 to the SS 14) and then using the channel sounding within the SS 14 to generate the downlink response. The downlink response may then be fed back from the SS 14 to the BS 12. The uplink channel may then be sounded and used within the BS 12 to generate the uplink response ($\alpha_{SS} h_U \beta_{BS}$). The estimated ratio $\rho$ may then be calculated using the above equation.

In the above estimate for $\rho$, it is assumed that the wireless medium response does not change between the measurement of the uplink response and the measurement of the downlink response. If the condition of the channel changes significantly during this time, the resulting value of $\rho$ may be inaccurate. However, channels in some wireless networks, such as those with high mobility users, can change rather quickly. Thus, the delay between downlink channel sounding and uplink channel sounding can result in a faulty calibration. This faulty calibration may then be used during subsequent communication operations, resulting in significant performance degradation in the wireless network.

In one aspect of the present invention, channel prediction techniques are used during a calibration process to reduce or prevent the occurrence of faulty calibrations. For example, with reference to FIG. 1, BS 12 may initially transmit channel sounding symbols to SS 14 through the channel 16. SS 14 may then use this channel sounding to predict what the downlink channel will be at the future time when the uplink channel sounding is performed. The SS 14 may include a channel prediction engine 34 to perform the channel prediction. The channel prediction engine 34 can be implemented in software, firmware, or hardware and may be part of the controller 32. Once the downlink channel has been predicted, the SS 14 may then feed this predicted channel information back to the BS 14 and also sound the uplink channel (either at the same time or within separate transmissions). The BS 14 may then use the uplink channel sounding to generate the uplink channel response at the time of the sounding. The calibration ratio $\rho$ may then be calculated by the BS 12 (e.g., controller 30) using the locally generated uplink channel response and the predicted downlink channel response received from the SS 14. As these channel responses are both associated with the same instant in time (i.e., the time of the uplink channel sounding), there should be a reduced level of calibration error. The main source of error will be in the accuracy of the channel prediction technique that is used to perform the prediction.

Any prediction technique may be used by the channel prediction engine 34 to predict the future downlink channel state. In an IEEE 802.16 embodiment, the prediction is facilitated by the broadcasting of dense common pilot signals by the BS for use in channel quality indication (CQI) feedback. The prediction is made feasible by the fact that there is strong correlation across the fading process. In at least one embodiment, a Wiener filter prediction approach is used. In other embodiments, a Kalman filter approach is used. In still other embodiments, parametric prediction techniques are used. Other techniques may alternatively be used The optimal linear predictor is the Wiener filter. The exact solution of the Weiner filter is written as:

$$w = (R_h + \sigma^2 I)^{-1} p \qquad (1)$$

where $$R_h = \begin{bmatrix} r(0) & r(1) & \cdots & r(N_p - 1) \\ r^*(1) & r(0) & \cdots & r(N_p - 2) \\ \vdots & & \ddots & \vdots \\ r^*(N_p - 1) & r^*(N_p - 2) & & r(0) \end{bmatrix};$$

$$p = [\, r^*(2) \quad r^*(3) \quad \cdots \quad r^*(1 + N_p)\,]^T;$$

the subscript * and $^T$ denote "conjugate transpose" and "transpose," respectively; and $N_p$ is the number of filter taps. The autocorrelation is computed as $$r(\tau) = \mathop{E}_{i,j,i_c}[H_{i,j}(i_c, t) H_{i,j}^*(i_c, t + \tau)],$$

where the expectation is over subcarriers $i_c$ and antenna indexes i and j and may be further refined by averaging over t. The predicted channel is computed as:

$$\hat{H}_{i,j}(i_c, t+2) = w^* h \qquad (2)$$

where $h = [H_{i,j}(i_c, t) \ldots H_{i,j}(i_c, t - N_p + 1)]^T$. The inversion in equation (1) is not necessary because adaptive implementations are available (e.g., LMS and RLS), which have complexities $O(N_p)$ and $O(N_p^2)$, respectively, and also track the variation in the autocorrelations by incorporating windowing and forgetting factor.

In one alternative approach, instead of performing the prediction of the downlink channel and then transmitting the predicted response to the BS 12 before or at the same time as the uplink channel sounding, the SS 14 waits until after the uplink channel sounding has been transmitted and then measures the downlink channel response using newly acquired downlink channel sounding. Once the downlink channel has been determined, interpolation is then used to determine the downlink channel response at the time that the uplink channel sounding was transmitted. This interpolated downlink channel response is then transmitted to the BS 12 for use in generating the calibration ratio ρ.

In a multiple-user MIMO (MU-MIMO) system, spatial division multiple access (SDMA) techniques may be used to allow multiple SSs to communicate concurrently with an associated BS in the same operational frequency band. This may be accomplished by selecting a subset of SSs in a coverage area for communications with the BS that uses roughly orthogonal beam forming vectors. Because the beam forming vectors are roughly orthogonal, a transmission from the BS to one of the selected SSs will create little or no interference for the other selected SSs. Likewise, the BS will be able to receive and separate signals transmitted simultaneously by the selected SSs. When employing multi-user diversity, a BS may first obtain channel related information about a larger number of SSs within a corresponding coverage area. The BS may then employ a selection criterion to select a subset of the SSs for communication based on the channel related information (e.g., to select SSs with roughly orthogonal beam forming vectors, etc.). After the subset of SSs have been selected, the BS may transmit data to the selected subscribe stations using corresponding beam forming vectors/matrices. In at least one approach, the BS may treat a selected group of single-antenna SSs as a single multi-antenna SS by using a single beam forming matrix to describe the corresponding MIMO channel.

Figure 2:
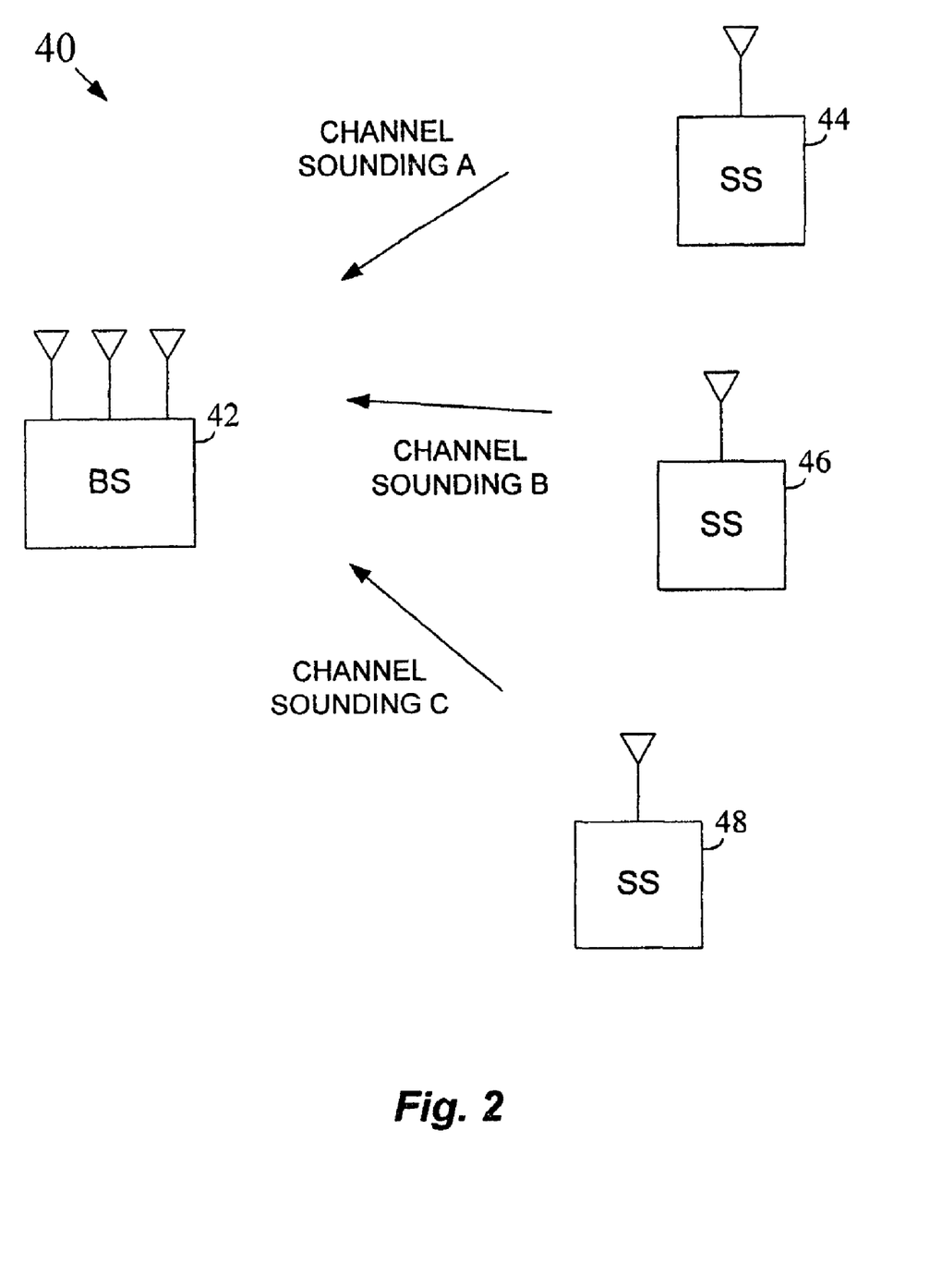
FIG. 2 is a block diagram illustrating an example multi-user wireless networking environment in accordance with an embodiment of the present invention.

FIG. 2 is a block diagram illustrating an example multi-user wireless networking environment 40 in accordance with an embodiment of the present invention. As shown, a plurality of SSs 44, 46, 48 are located within a coverage area of an associated BS 42. In the illustrated example, the SSs 44, 46, 48 are each single antenna devices and the BS 42 is a multi-antenna device. In other embodiments, SSs with multiple antennas may be used. To implement multi-user diversity in a conventional manner, the BS 42 may first request that each of the SSs 44, 46, 48 sound a corresponding uplink channel. The SSs 44, 46, 48 may do this in a sequential fashion, one after another. The BS 42 may use the uplink sounding to generate channel state information (CSI) for each of the SSs 44, 46, 48. Once the CSI has been generated for each of the SSs 44, 46, 48, the BS 42 may use it select a subset of the SSs 44, 46, 48 with which to concurrently communicate. The BS 42 may perform the selection by identifying a subset of SSs that have roughly orthogonal beam forming vectors. Other criteria may also be considered such as, for example, scheduling fairness, signal strength, and others. Although there are only three SSs 44, 46, 48 illustrated in FIG. 2 to simplify illustration, it should be understood that there are typically a much larger number of active SSs within a coverage region from which a subset is selected.

A problem with the above described multi-user technique is that the delays inherent in the multi-user diversity process can make the collected channel information stale by the time it is actually used. For example, by the time the last of the requested SSs has sounded the uplink channel, the channels of the first SSs to sound the uplink channel may have changed considerably (particularly for high mobility SSs). The more SSs that are asked to sound the channel, the longer the delay and, therefore, the greater the probability of error in the channel information. However, the performance gains that are achieved by implementing multi-user diversity are dependent upon a relatively large number of SSs being considered for use. The errors within the collected channel information that are due to the long delays can result in suboptimal selection of SSs. The errors may also result in the use of suboptimal beam forming vectors when the BS eventually transmits data to the selected subset of SSs. As is well known, multi-user MIMO is especially sensitive to beam forming errors during data transfer.

In at least one embodiment of the present invention, the occurrence of performance reducing errors within channel related information in a network using multi-user MIMO is reduced through the use of channel prediction techniques. For example, with reference to FIG. 2, each of the SSs 44, 46, 48 may include channel prediction functionality (e.g., channel prediction engine 34 of FIG. 1, etc.) that allows the unit to predict a future downlink channel based on channel sounding received from the BS 42. The prediction may be for the time when a data transfer will eventually occur between the BS and the SSs in the selected subset (which can be a significant amount of time after the channel sounding). The prediction time may also be set to be large enough to accommodate the soundings. The base station can obtain channel responses before the prediction time by interpolation if the total sounding time is shorter than what is expected. As before, any type of channel prediction technique may be used to perform the prediction including, for example, a Wiener filter approach, a Kalman filter approach, a parametric approach, and/or others. After the prediction has been generated, a SS can then transmit this information to the BS 42 for use in selecting a subset of SSs and/or for use in beam forming during a future data transfer to selected SSs.

In an alternative arrangement, each of the SSs 44, 46, 48 may, in addition to predicting a future downlink channel, determine a difference between the predicted response and the uplink channel response when the uplink channel sounding (or normal uplink traffic or the difference prediction) is sent to BS 42. The SSs 44, 46, 48 may each then transmit information indicative of the difference to the BS 42. The difference information may be transmitted with the corresponding uplink channel sounding or with the normal uplink traffic. In one approach, the difference information may be in the form of a ratio d, as follows:

$$d = \frac{\hat{g}(t+\tau)}{g(t)}$$

where $\hat{g}(t+\tau)$ is the predicted downlink channel response and g(t) is the predicted response when the uplink channel sounding (or normal uplink traffic or difference feedback) is sent. These predicted responses are vectors, whose i-th entry is the channel response between the i-th BS transmit chain and the SS receive chain. Other techniques for describing a difference between channel responses may alternatively be used.

When the BS 42 receives the uplink channel sounding from a SS, it may first use the sounding to generate channel information for the corresponding uplink channel. Once the channel information has been generated, the BS 42 may then use the difference information and the generated channel information to calculate channel information for the future time when the data transfer with the selected SSs will be performed. If the prediction time is later than the data transmission time, interpolation may be used to obtain the channel response of the transmission time. The resulting channel information may be used during the selection process to select the subset of SSs to be simultaneously served by the BS 42. The channel information may also be used to perform beam forming during the eventual data communication with the selected SSs (i.e., the channel information may be used to generate the beam forming vectors needed to perform the beam forming).

In at least one embodiment, the difference information generated within a SS is quantized before it is transmitted to the BS 42. The responses g(t) and ĝ(t+τ) are typically highly correlated, thus the ratio d will usually be distributed within a small region on the complex N-dimensional space, with a mean of 1. For this reason, it is possible to efficiently quantize the ratio d using a relatively small number of bits. For example, for a SS with a single receive chain, the downlink channel vector at time t can be expressed as follows:

$$g(t) = \begin{bmatrix} g_1(t) \\ \vdots \\ g_N(t) \end{bmatrix}$$

where $g_i(t)$ is the link response at time t between the i-th BS transmit chain and the SS receive chain. Similarly, the predicted downlink channel vector may be expressed as:

$$\hat{g}(t+\tau) = \begin{bmatrix} \hat{g}_1(t+\tau) \\ \vdots \\ \hat{g}_N(t+\tau) \end{bmatrix}$$

where τ is the time delay between the uplink sounding and scheduled data transfer between the BS and the selected SSs. The differential vector d may therefore be represented as:

$$d = \frac{|\hat{g}(t+\tau)|}{|g(t)|} e^{-j\phi} u$$

where φ is the phase of the first entry of g(t) and u is a unit vector having a length of 1. In the above representation, the length term $$\frac{|\hat{g}(t+\tau)|}{|g(t)|}$$

and the global phase term $e^{-j\phi}$ typically have little or no effect on beam forming. For example, u and $e^{j\psi}u$ have the same beamforming performance for any global phase ψ. These reduce the quantization bits of d. Therefore, in at least embodiment of the invention, these terms may be dropped before quantization. The quantization transformation may then be performed on the unit vector u which is representative of the direction of the resulting beam. The vector quantization of d may require high complexity. The vector quantization may be replaced by scalar quantizations that result in more quantization bits. Define $$d_i = \frac{\hat{g}_i(t+\tau)}{g_i(t)}$$

for i=1, . . . ,N. The $d_i$ is a complex number close to 1 in square norm. Each $d_i$ can be quantized by a set of quantization points and the quantization index is fed back.

As described above, in one approach, the difference information may be transmitted from the SS to the BS with the uplink channel sounding. In at least one embodiment of the invention, this may be performed as follows. First, a set of $2^K$ sequences is designed for the K bits of the differential message. The SS will feed back one of these K bit sequences to the BS using the sounding symbols. The BS may then conduct joint channel estimation and message detection on the received sounding, in a manner similar to that used for CQI MIMO feedback in the IEEE 802.16e wireless networking standard. In addition, or alternatively, the SS may piggy back the K bit sequence with the normal uplink traffic. The BS will estimate the channel of the uplink traffic and decode the K bits. The BS may then use this information to determine the predicted future link response. In an alternative approach, the BS can use interpolation to compute the link response between t and t+τ for SS scheduling and MU-MIMO beamforming.

Figure 3:
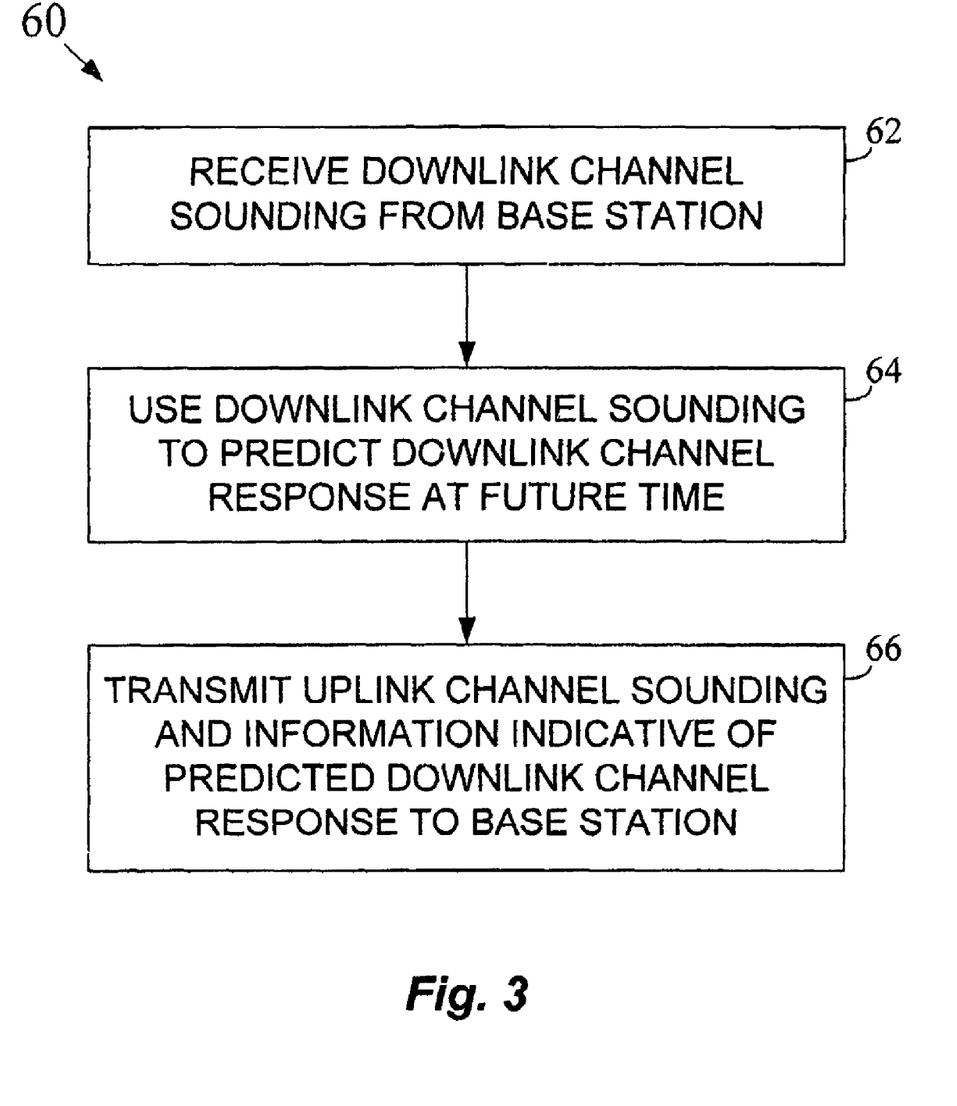
FIG. 3 is a flowchart illustrating an example method for use in a wireless network in accordance with an embodiment of the present invention.

FIG. 3 is a flowchart illustrating an example method 60 for use in a wireless network in accordance with an embodiment of the present invention. The method 60 may be used during a calibration procedure within a closed loop MIMO link using implicit feedback. In another application, the method 60 may be used within a multi-user MIMO scenario to generate channel information for use in subscriber station selection and/or beam forming operations. First, downlink channel sounding is received from a base station (block 62). Next, a downlink channel state is predicted for a future point in time using the received channel sounding (block 64). When performing a calibration procedure, the prediction is for a future time when uplink channel sounding will be transmitted to a BS. In a multi-user MIMO implementation, the prediction is for a future time at which a data transfer will take place between a base station and a number of selected subscriber stations.

Uplink channel sounding may next be transmitted to the base station along with information that is indicative of the predicted downlink channel state (block 66). The uplink channel sounding and the predicted channel information may be transmitted as part of the same transmission or in separate transmissions. In an implicit feedback calibration implementation, the information that is indicative of the predicted downlink channel state may include, for example, a full channel vector or matrix or a compressed version thereof. Likewise, in a multi-user MIMO implementation, a compressed or uncompressed version of a predicted channel matrix or vector may be transmitted (fed back to) the base station. In another approach, as described previously, a subscriber station may determine a difference between the predicted channel response and a present channel response and transmit some indication of this difference (e.g., difference vector d described previously, etc.) as the information that is indicative of the predicted downlink channel state. In at least one implementation, the difference information is quantized before it is transmitted. For example, as described previously, the length and global phase of the difference vector d may be ignored and only the resulting unit vector is subjected to quantization. Other representations of the predicted channel information may alternatively be used.

Figure 4:
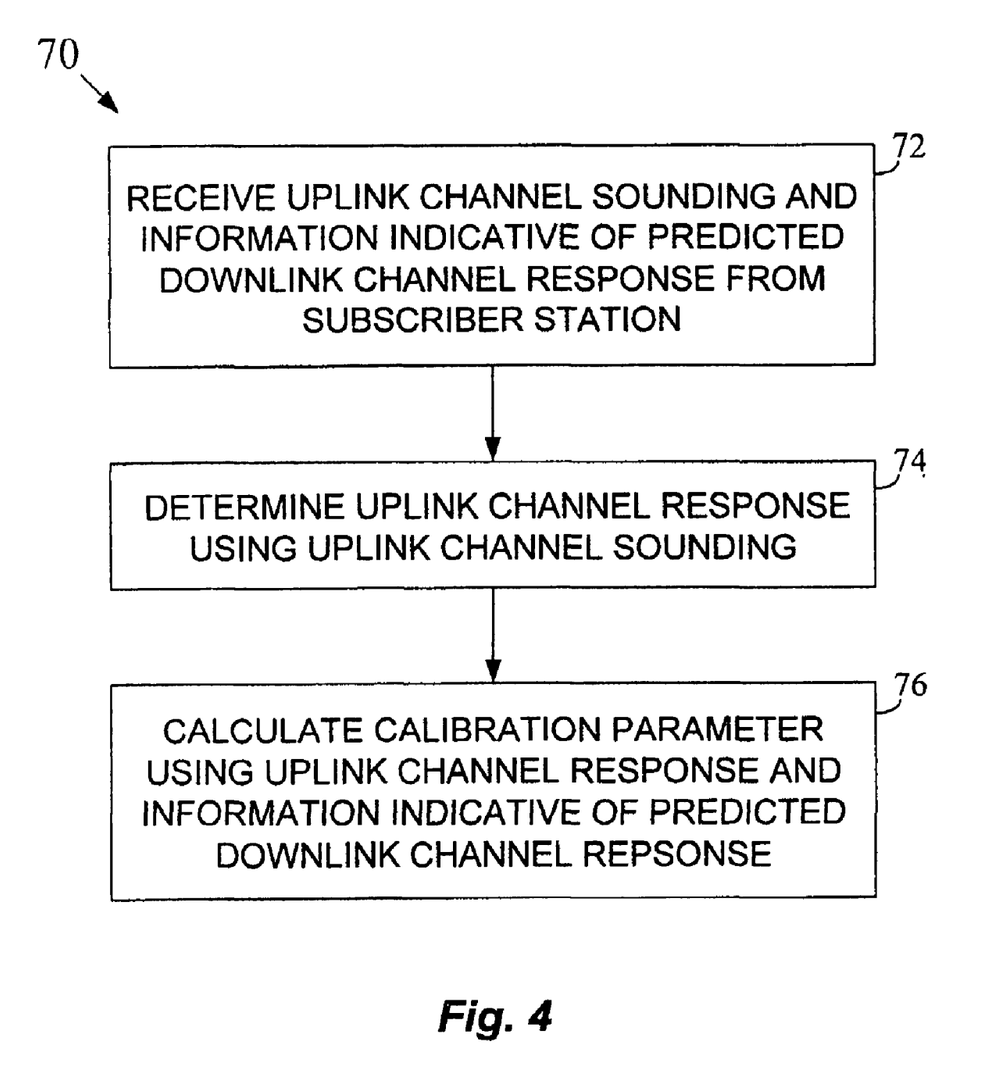
FIG. 4 is a flowchart illustrating an example method for use during an implicit feedback calibration procedure for a MIMO link in accordance with an embodiment of the present invention.

FIG. 4 is a flowchart illustrating an example method 70 for use during an implicit feedback calibration procedure for a MIMO link in accordance with an embodiment of the present invention. First, uplink channel sounding and information indicative of a predicted downlink channel response is received from a SS (block 72). The predicted downlink channel response may have been previously predicted for the time at which the uplink channel sounding was transmitted. An uplink channel response is next generated using the received uplink channel sounding (block 74). A calibration parameter is then calculated for the MIMO link using the uplink channel response and the predicted downlink channel response (block 76). In at least one implementation, the calibration parameter that is generated is the ratio ρ described previously. Other parameters may alternatively be used. Because a predicted downlink channel response is used instead of a real time channel response, errors associated with channel changes during the delay between downlink channel estimation and uplink channel estimation may be reduced significantly.

Figure 5:
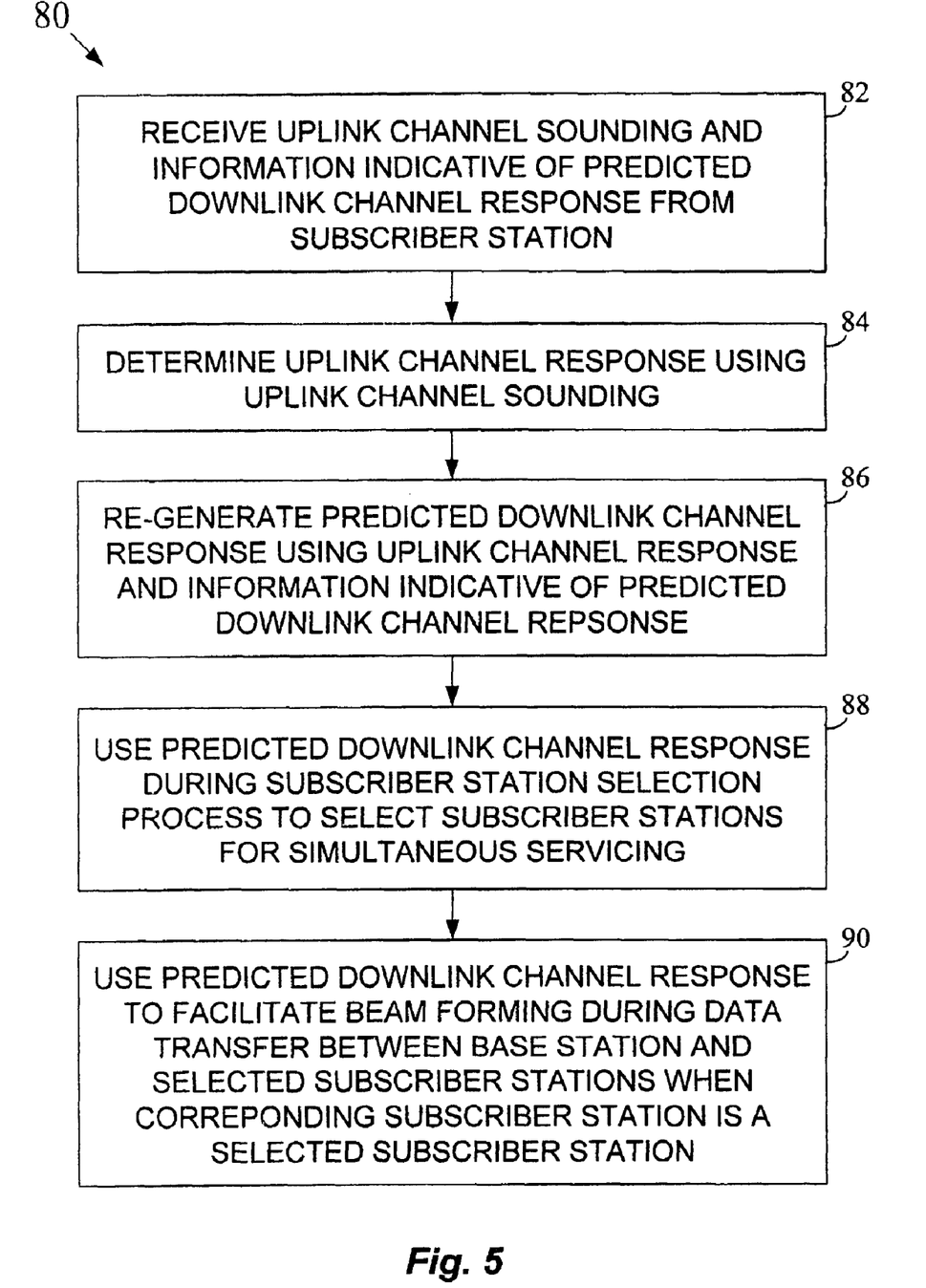
FIG. 5 is a flowchart illustrating an example method for use in connection with a wireless link practicing multi-user MIMO in accordance with an embodiment of the present invention.

FIG. 5 is a flowchart illustrating an example method 80 for use in connection with a wireless network practicing multi-user MIMO in accordance with an embodiment of the present invention. First, uplink channel sounding and information indicative of a predicted downlink channel response is received from a SS (block 82). In at least one implementation, the information indicative of a predicted downlink channel response includes difference information describing a difference between a current channel response (i.e., a response at approximately the time of the uplink sounding) and the predicted future response. The predicted future response may be predicted for a future time when a data transfer is scheduled to occur between the BS and a number of selected SSs. The uplink channel sounding may next be used to generate an uplink channel response for the corresponding uplink channel (block 84). The predicted downlink channel response may then be re-generated using the uplink channel response and the information indicative of a predicted downlink channel response (e.g., the difference information). If a ratio d is used, the re-generation of the predicted downlink channel response in the base station may require only a simple multiplication by the ratio. In at least one embodiment, the difference information is quantized before being transmitted to the BS.

The re-generated predicted downlink channel response may subsequently be used during a SS selection process to select multiple SSs that will be simultaneously serviced by the BS in a multi-user MIMO operation (block 88). This process may, for example, use the re-generated predicted downlink channel response to generate a beam forming vector for the corresponding SS. Beam forming vectors may also be generated for other SSs under consideration, in a similar manner. The selection process may then select a subset of the SSs under consideration for simultaneous servicing that have roughly orthogonal beam forming vectors. Techniques for selecting SSs for simultaneous servicing based on channel information are well known in the art. After SSs have been selected for simultaneous servicing, if the subject SS is within the selected group, the re-generated predicted downlink channel response may again be used for beam forming purposes when data is eventually transferred to the selected SSs by the BS (block 90).

In the description above, terminology has been used that is generally associated with the IEEE 802.16 wireless networking standard. It should appreciated, however, that the inventive methods and structures are not limited to implementation within IEEE 802.16 based systems. On the contrary, features of the invention may be used in connection with any wireless network following any wireless networking standard that may experience performance degradation due to channel changes occurring during a delay between the measurement of channel information and use of the information. Applications exist, for example, within networks following IEEE 802.11n, 3GPP LTE, and others. As used herein, the term "user station" is intended to include any communication device associated with a user that can communicate with an associated base station. This may include, for example, subscriber stations in networks following IEEE 802.16, STAs in networks following IEEE 802.11, cellular telephones and/or other handheld communication devices, vehicle mounted communicators, and other wireless communication devices. The term "base station" as used herein is intended to include wireless access points and other devices and subsystems through which user devices may access a network. It should be appreciated that the techniques described herein may be practiced using any form of transmitted channel training information and are not limited to use with dedicated channel sounding transmissions. For example, training information within the normal link traffic may be used in some embodiments.

The methods and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on computer readable media; and/or in other formats. Examples of different types of computer readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
receiving uplink channel training information and information indicative of a predicted downlink channel response from a wireless user station, at a base station, wherein said information indicative of said predicted downlink channel response includes a difference between a predicted uplink channel response and said predicted downlink channel response, and information indicative of said predicted downlink channel response includes a response predicted for a time when a future multi-user Multiple Input, Multiple Output (MIMO) data transfer is scheduled to occur between said base station and a plurality of selected user stations;

estimating an uplink channel response using said uplink channel training information; and performing a communication function using said uplink channel response and said information indicative of a predicted downlink channel response, wherein performing a communication function includes:

re-generating said predicted downlink channel response and using said re-generated predicted downlink channel response within a selection process to select multiple wireless user stations for simultaneous servicing by said base station using the MIMO, and performing transmit beam forming for said wireless user station using a beam forming matrix derived from said re-generated predicted downlink channel response when said wireless user station is one of said selected wireless user stations.

2. The method of claim 1, wherein:
information indicative of the predicted downlink channel response includes a response predicted for a time when said uplink channel training information is to be transmitted.

3. The method of claim 1, wherein:
receiving uplink channel training information and information indicative of said predicted downlink channel response from said wireless user station includes receiving said uplink channel training information and said information indicative of said predicted downlink channel as part of the same transmission.

4. The method of claim 1, wherein:
said information indicative of said predicted downlink channel response includes a channel vector.

5. The method of claim 1, wherein:
said difference includes a ratio that is quantized before transmission.

6. The method of claim 1, wherein:
performing the communication function includes generating a calibration parameter for use in supporting implicit feedback in a network using closed loop MIMO.

7. An apparatus comprising:
a wireless transceiver;
an estimator to estimate an uplink channel response using uplink channel training information received from a wireless user station; and a controller to:
obtain uplink channel training information and information indicative of a predicted downlink channel response from the wireless user station as part of the same transmission, via said wireless transceiver, wherein said information indicative of a predicted downlink channel response includes a difference between a predicted uplink channel response and said predicted downlink channel response;

use said estimation engine to estimate the uplink channel response using said uplink channel training information; and perform a communication function using said uplink channel response and said information indicative of a predicted downlink channel response, wherein performing a communication function includes:

re-generation of said predicted downlink channel response, use of said re-generated predicted downlink channel response within a selection process to select multiple wireless user stations for simultaneous servicing by said base station using multi-user multiple input, multiple output (MIMO), and performance of transmit beam forming for said wireless user station using a beam forming matrix derived from said re-generated predicted downlink channel response when said wireless user station is one of said selected wireless user stations.

8. The apparatus of claim 7, wherein:
information indicative of the predicted downlink channel response includes the predicted downlink channel response for a time when said uplink channel training information is scheduled to be transmitted.

9. The apparatus of claim 7, wherein:
information indicative of the predicted downlink channel response includes the predicted downlink channel response for a time when a future multi-user MIMO data transfer is scheduled to occur between said base station and a plurality of selected user stations.

10. The apparatus of claim 7, wherein:
said information indicative of said predicted downlink channel response includes a channel matrix.

11. The apparatus of claim 7, wherein:
said difference includes a ratio that is quantized, before transmission, into a K bit sequence.

* * * * *